Aug. 19, 1924.
1,505,653
R. H. McLAIN
ELECTRICAL BRAKING CONTROL
Filed Aug. 16, 1923
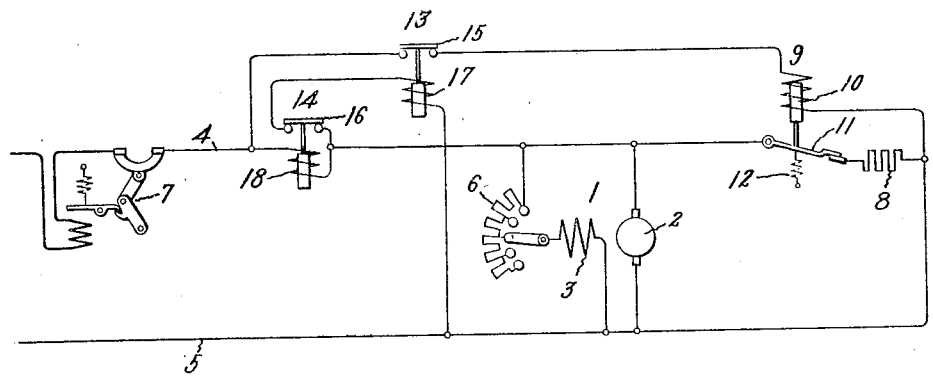
Inventor:
Robert H. McLain,
by *[signature]*
His Attorney.

Patented Aug. 19, 1924.

1,505,653

UNITED STATES PATENT OFFICE.

ROBERT H. McLAIN, OF TENAFLY, NEW JERSEY, ASSIGNOR TO GENERAL ELECTRIC COMPANY, A CORPORATION OF NEW YORK.

ELECTRICAL BRAKING CONTROL.

Application filed August 16, 1923. Serial No. 657,772.

*To all whom it may concern:*

Be it known that I, ROBERT H. McLAIN, a citizen of the United States, residing at Tenafly, in the county of Bergen, State of New Jersey, have invented certain new and useful Improvements in Electrical Braking Controls, of which the following is a specification.

This invention relates to the braking control of an electric motor that is connected to an active load such as a belt conveyor, a hoist or the like, which drives the motor as a regenerative braking generator in certain phases of operation.

When such a load is being raised it is common practice to provide a pawl and ratchet or other suitable safety stop mechanism for preventing backward travel of the active load. But when the load is lowered under the restraint of the motor operating as a regenerative brake, the pawl or other mechanism must necessarily be disengaged. Hence a failure of the power source with which the motor is connected, during regeneration, is likely to cause serious accidents due to the rapid acceleration of the load to excessive speed unless some additional braking restraint is provided. In order to meet such an emergency either electromagnetic or manually operated friction brakes have been provided for arresting the load. However, since a series electromagnetic brake is released only when the motor is operating with a substantial current and a shunt brake will be energized from the braking generator notwithstanding the failure of power, such brakes as well as any manually operated brake obviously have limited fields of satisfactory application.

One object of the present invention is to provide additional braking restraint when power fails during regenerative braking operation by establishing connections which will permit adaquate dynamic braking of the motor even though there be a total loss of line power.

Another object of my invention is to provide a control for the dynamic braking connections which is automatically responsive to the change in the electrical characteristics of the circuit when power fails and the braking generator is driven at excessive speed by the descending load.

A further object of my invention is the provision of such a braking control which is responsive to the change in the electrical characteristics of the circuit when power is restored to open the dynamic braking connections of the motor and allow the normal regenerative braking operation of the motor to continue.

The novel features which I believe to be characteristic of my invention are set forth in the appended claims. My invention itself, however, both as to its organization and method of operation will best be understood by reference to the following description taken in connection with the accompanying drawing which shows diagrammatically a braking control embodying my invention.

As illustrated in the drawing, 1 represents a dynamo electric machine having an armature 2 and a field winding 3 connected across the lines 4 and 5 to operate either as a shunt wound motor or generator. A variable rheostat 6 is provided for regulating the current in the field winding 3 and thus govern the operating speed of the motor as well as the voltage generated when the motor operates as a braking generator. Lines 4 and 5 are connected with a suitable source of energy not shown, such as the ordinary commercial power mains, from which machine 1 may receive current during motoring operation and to which current is returned during regenerative braking operation. It will be understood that suitable controllers of either the hand operated or automatic type are provided for starting and stopping the motor, and no further description need be made of such controllers as they do not form a part of the present invention. A circuit breaker 7 may be inserted in one of the lines as shown to afford overload protection. The shaft of armature 2 is mechanically connected through suitable gearing, not shown, to drive an inclined belt conveyor, a hoist, or in fact any apparatus presenting an active load, which drives the armature as a regenerative brake, but for the purpose of describing my invention, it will hereinafter be assumed that armature 2 is mechanically connected to operate an inclined belt conveyor.

When thus connected, the dynamo electric machine 1 is adapted to operate as a driving motor in conveying a load up the incline conveyor or as a load driven regenerative brake for maintaining a desired speed in carrying a load down the conveyor.

My invention, as indicated above, is concerned principally with the control of a dynamic braking circuit for the motor which will automatically become effective to restrain the speed of the conveyor within safe limits should the power source fail during regenerative operation. The dynamic braking circuit shown in the drawing includes a resistor 8 which is proportioned to afford a suitable dynamic braking load for the motor under the conditions just mentioned. The dynamic braking circuit is controlled by an electromagnetic switch 9 having a winding 10 adapted to be operatively energized by either the normal voltage of the source or the overspeed voltage of the motor. The movable contact arm 11 of switch 9 is connected in series with the resistor 8 to form the dynamic braking circuit for motor 1 and this contact arm is biased to closed position by any suitable means such as spring 12.

A pair of electromagnetic relays 13 and 14 are provided for controlling the energizing circuit of winding 10 of switch 9, both relays being of the well known circuit opening type having their respective circuit controlling contacts 15 and 16 biased to closed position by the weight of the operating armatures as shown or in any other suitable manner, and operable to open position upon a sufficient energization of the respective relay windings. Relay 13 is provided with an operating winding 17 adapted to be connected across the motor lines 4 and 5 and which is so designed as to operate contact 15 to open position when energized by a voltage above a certain value. For the purpose of my invention, winding 17 is designed to open contact 15 of relay 13 only when the voltage between lines 4 and 5 exceeds the voltage of the source by a predetermined amount, for example, 10 or 20 per cent. Such a voltage value will be regenerated by the motor should the power source fail during regeneration and the load tend to race the motor above normal speed. Relay 14 is provided with an operating winding 18 adapted to be connected in series with one of the motor lines, in line 4 as shown, and so designed as to raise contact 16 to circuit opening position when energized by a current above a predetermined value.

As thus constructed and arranged, the operation of my invention is as follows:

With the loaded conveyor held at rest by the removable safety stop and the parts in their respective positions shown in the drawing, all circuits are deenergized. Upon closure of the power supply switches, not shown in the drawing, the motor starting controller, also not shown, may be operated to carry a load up the inclined conveyor, or upon disengagement of the safety stop, the controller may be operated to regenerative braking position for lowering the load. In both operations the application of normal voltage to motor lines 4 and 5 also energizes winding 10 of switch 9 which operates switch arm 11 to open position against the bias of spring 12, thereby rendering the dynamic braking circuit inoperative. It will be observed that the lower terminal of winding 10 is connected directly to line 5 and the upper terminal is connected through contact 15 of relay 13 to the other line 4. Contact 15 remains in circuit closing position although the circuit through its operating winding 17 remains closed at contact 16, since, as previously pointed out, relay 13 is designed to respond only to a voltage in excess of the normal voltage of the source.

With an ascending or descending load the machine 1 operates respectively as a motor or a regenerative braking generator, and either receives or returns current to the source. In each case winding 18 of relay 14 is energized to open contact 16 upon the exchange of an appreciable current. The opening of contact 16 interrupts the circuit in which winding 17 is connected across the motor lines 4 and 5 and prevents operation of relay 13 even though the voltage generated by armature 2 during regeneration should exceed that at which relay 13 is designed to respond. Thus the pair of relays 13 and 14 cooperate during all conditions of motoring or regeneration to keep the circuit of winding 10 of electromagnetic switch 9 energized from lines 4 and 5 and maintain the dynamic braking circuit inoperative.

Now, assume that the source of energy fails during either motoring or regenerative operation. In the former case the active load rapidly slows down and the previously mentioned pawl and ratchet safety stop with which the conveyor is provided serves to stop any reverse movement of the load. When, however, the power failure occurs during regeneration, the safety stop is disengaged and my improved dynamic braking control becomes effective. Relay 14 is immediately deenergized due to the removal of the regenerative load from the motor and the consequent decrease of regenerated current below the predetermined value at which relay 14 is designed to respond. Upon the deenergization of relay 14, the circuit for winding 17 of relay 13 is completed by closure of contact 16. Relay 13 is thereupon made responsive to the voltage generated by motor 1. Should the load race the motor above the speed at which the predetermined voltage required for operating relay 13 is generated, the dynamic braking circuit is rendered operative in the following manner. Relay 13 will at once respond and open the energizing circuit of winding 10 of electromagnetic switch 9 at contact 15, thus allowing spring 12 to close switch arm 11 and connect the dynamic braking circuit across armature 2 to dynamically brake the motor to a safe speed.

Upon return of power, current is again returned from the motor to the line and relay 14 is energized and opens contact 16. This interrupts the energizing circuit of winding 17 of relay 13 and contact 15 falls to circuit closing position, thus energizing winding 10 of switch 9 from the motor lines 4 and 5. Upon response of switch 9, switch arm 11 is raised to open the dynamic braking circuit and permit the normal regenerative braking operation to continue.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a system of electric braking, the combination with a dynamo electric machine adapted to be connected to a source of supply to operate as a motor to drive an active load and to operate as a load driven generator to regeneratively brake the load, of a dynamic braking circuit for said machine, electro-responsive means for controlling said circuit and connections whereby the energization of said electro-responsive means is controlled to close said circuit responsively to the failure of the source during regenerative braking operation of said machine and the racing of said machine by the load during such failure.

2. In a system of electrical braking, the combination with a dynamo electric machine adapted to receive current from a source of supply to operate as a motor to drive an active load and to be driven by the load to operate as a regenerative braking generator to return current to the source, of a dynamic braking circuit for said machine, electro-responsive means for controlling said circuit, and connections whereby the energization of said means is controlled in response to a predetermined decrease of regenerated current and a predetermined increase of generated voltage of said machine, to close said circuit and dynamically brake the load.

3. In a system of electrical braking, the combination with a dynamo electric machine adapted to receive current from a source of supply to operate as a motor to drive an active load and to be driven by the load to operate as a regenerative braking generator to return current to the source, of a dynamic braking circuit for said machine, an electromagnetic switch for controlling said circuit, a pair of relays for controlling the energization of said switch, one of said relays arranged to operate responsively to a predetermined decrease of the regenerated current, and the other arranged to operate responsively to a predetermined increase of the voltage generated by said machine when operating as a generator and connections whereby upon a failure of the source during regenerative braking and the racing of said machine by the load during such failure said relays effect the operation of said electromagnetic switch to close said dynamic braking circuit.

4. In a system of electrical braking, the combination with a dynamo electric machine adapted to receive current from a source of supply to operate as a motor to drive an active load and to be driven by the load to operate as a regenerative braking generator to return current to the source, of a dynamic braking circuit for said machine, an electromagnetic switch biased to closed position and adapted to be energized from either the source or from said load driven generator for controlling said circuit, an electro-magnetic relay responsive to the current from or to the source, a second relay responsive to a predetermined voltage generated by said machine when operating as a generator, and connections whereby when said motor receives or returns current to said source, the first relay opens the circuit of the second relay to energize said switch to maintain said dynamic braking circuit inoperative and when said motor fails to receive or return current to said source and generates the said predetermined voltage said first relay closes the circuit of the second relay to de-energize said switch and render said dynamic braking circuit operative to brake the load.

In witness whereof, I have hereunto set my hand this fourteenth day of August, 1923.

ROBERT H. McLAIN.